Feb. 20, 1962  A. W. SEAR ETAL  3,022,395
PRESSURE RESPONSIVE APPARATUS
Filed Dec. 30, 1958
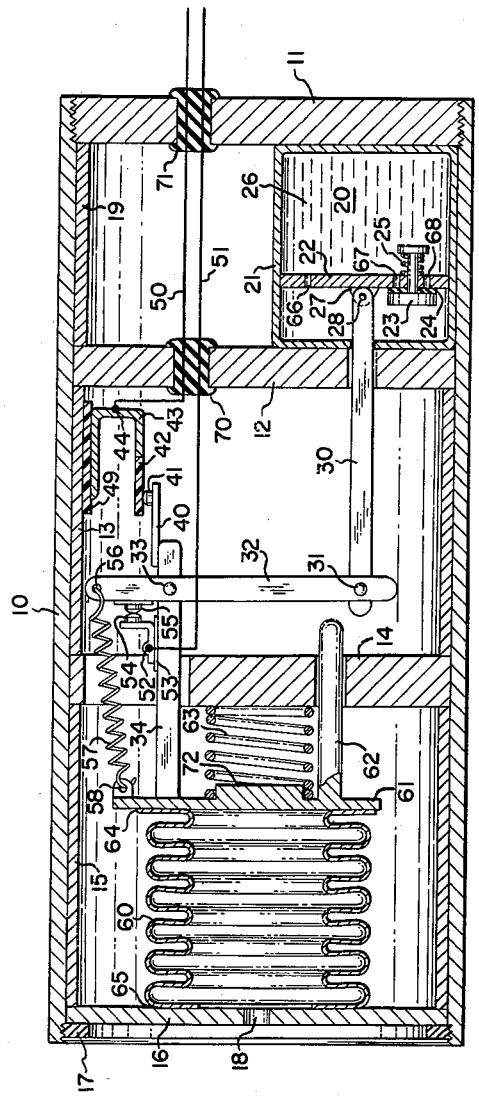
INVENTORS
PAUL D. SCHULZ
ARTHUR W. SEAR
DAVID E. WHITE
BY
*Warren A. Sturm*
ATTORNEY

United States Patent Office 3,022,395
Patented Feb. 20, 1962

3,022,395
PRESSURE RESPONSIVE APPARATUS
Arthur W. Sear, Arcadia, Calif., and Paul D. Schulz, St. Louis Park, and David E. White, St. Paul, Minn., assignors to Minneapolis-Honeywell Regulator Company, Minneapolis, Minn., a corporation of Delaware
Filed Dec. 30, 1958, Ser. No. 783,769
7 Claims. (Cl. 200—83)

This invention relates generally to pressure responsive apparatus and is more particularly directed to apparatus responsive to the total pressure and rate of change of pressure in a fluid medium to provide control signals in accordance therewith.

In a certain number of applications dealing with the movement of a body through a fluid medium, it becomes desirable to be able to sense, indicate, and control the operation of a device in accordance with the relative pressure of the fluid medium and in accordance with the rate of change of relative pressure of the fluid medium as the body moves in the medium. One specific application of this type might be a depth charge to be used in the field of underwater ordnance. In a specific illustrative example of an application of this device, it is normally contemplated that the depth charge will be detonated at a predetermined depth which, of course, is dependent upon the pressure applied by the fluid medium at the particular depth. This particular type of operation is, of course, subject to certain discrepancies, none the least of which is the fact that should the depth charge fail to reach the predetermined depth (determined by pressure) it will not go off. It is fairly obvious that it is undesirable from two standpoints to allow this condition to exist, the first is the failure of the mission in destroying the desired target, and the second is the presence of an unstable explosive object on the floor of the ocean.

The present invention is therefore partly concerned with a novel apparatus for providing a signal indicative of the condition that exists when the depth charge, or other body comes to rest in the fluid medium at a depth that does not provide a pressure that is required for detonation. This is accomplished by providing a device that is responsive to rate of change of pressure to supply a signal that may be used for indication or detonation when the rate of change of pressure falls below a predetermined minimum value, as would occur when the depth charge came to rest before attaining the depth at which detonation is desired.

In present weapons of the type noted above as an example of the use for the present invention, a pressure responsive switch known as a hydrostat is utilized to provide a detonation signal when a predetermined depth in the fluid medium has been reached. These devices are responsive only to total pressure (which is normally proportional to depth). As will be noted below, by suitable proportioning of the mechanism of the present invention, a two fold function may be obtained, that is, a signal may be supplied at a predetermined pressure or a signal may be supplied when the rate of change of pressure falls below a predetermined value.

It is therefore an object of our invention to provide an apparatus that is responsive to the rate of change of pressure to supply a signal that is indicative of the condition regarding the velocity of movement of the apparatus through a fluid medium.

It is a further object of our invention to provide an apparatus that is responsive to the movement of the apparatus through a fluid medium in a direction that is accompanied by a pressure change and to provide an output signal when the rate of change of pressure falls below a predetermined minimum value.

It is a still further object of our invention to provide apparatus responsive to the rate of change of pressure associated with movement through a fluid medium to provide a signal to indicate the magnitude of rate of change of pressure above or below a predetermined value.

Other objects and advantages of our invention will become apparent from a consideration of the appended specification, claims and drawing which is a sectional view, partly schematic, of a device embodying the principles of my invention.

Referring to the drawing, there is shown, in cross-section, a cylindrical housing 10, that is divided into roughly three sections by the bulkhead members 11, 12, 14, and 16. Bulkhead 11 is shown affixed to the right hand end of the casing member 10 by means of screw threads. Bulkhead 12 is held in fixed relationship with bulkhead 11 by a spacer 19. Bulkhead 14 is held in fixed relationship with bulkhead 12 by a spacer 13, and bulkhead 16 is held in spaced relationship from bulkhead 14 by a spacer 15. A retaining ring 17 is provided with a thread on its outside periphery that is adapted to co-act with the threaded portion of the left hand end of the housing 10 to retain the parts in position on the inside of the container. The bulkheads and spacers may be made of suitable shape and size so as to fit conveniently inside of the cylindrical housing 10. The material used in their construction should be compatible with the environment in which the device is to be used.

Shown at the lower right hand corner of the drawing is a damping member 20. The illustrative embodiment shown here is commonly known as a dash pot and comprises a generally cylindrically shaped housing 21 which may be filled with a fluid indicated generally by the reference character 26. Contained within the dash pot housing is a piston member 22 having a plurality of orifice openings 66, 67, and 68. In the present embodiment, since it is desirable to allow for a more rapid movement of the damping member in one direction than in the other, the orifices 67 and 68 are shown covered with a sealing member 24 that is carried on a poppet valve body 23 that is spring biased to one position by spring member 25. In the arrangement shown, the piston member 22 of dash pot 20 may be moved more rapidly in a right hand direction due to the opening of the poppet valve 23. Affixed to the left hand base of the piston member 22 is member 27 that may be utilized to provide connection to external linkage for the connection of the piston member 22 in a system.

Shown in the left hand end of the drawing, is a flexible bellows 60 that is securely fastened, as by soldering, to the bulkhead 16 at the joint designated generally by reference character 65. The opposite end of the bellows member 60 is securely fastened to a displaceable member 61 in the same manner at a joint that is designated generally by reference character 64. An opening 18, is provided in bulkhead 16 to provide for the free movement of a fluid medium into and out of the bellows member 60 in accordance with the relative pressure of a fluid medium. Displacement member 61 has a first projection 62 and a second projecting member 34, and a boss member 72 positioned at its central portion. A compression spring 63 extends between bulkhead 14 and displacement member 61 and is held in position thereon by the boss member 72.

A lost motion or strain release mechanism for transmitting motion from displaceable member 61 to damping member 20 is shown in the center portion of the drawing and comprises a member 30 connected to piston 22 on damping member 20 through a pin 28 at its right hand end and to member 32 through a pin 31 at its left hand end. Member 32 is further connected to member 34 on displaceable member 61 through a pin 33 positioned near the right hand end of member 34. The member 32 is freely rotatable about the pins 31 and 33 to thereby allow relative movement between member 34 on displacement member 61 and damping member 20. A tension spring 57 is positioned with its right end inserted through a perforation 56 at the upper end of member 32 and its left end inserted through a perforation 58 in a lug provided at the upper end of displaceable member 61.

A contact 54 is mounted on an insulating member 53 that is in turn mounted on member 34. A movable contact 55 is mounted on the upper portion of member 32. Contact 54 is relatively stationary with respect to contact 55 and although movable with respect to casing 10 will be referred to herein as stationary contact 54. A further movable sliding contact 41 is mounted on a bracket 40 that is in turn mounted on the right end of member 34. A composite stationary contact that is adapted to co-act with movable sliding contact 41 is mounted in proximity with contact 41 and insulated from spacer element 13 by an insulating member 49. It will be noted that the composite stationary contact includes a body at its right end of conductive material that is designated by reference character 43 and a further portion at the left end of the lower portion of the contact that is comprised of insulating material and is designated by reference character 42. An electrical conductor 50 is connected to stationary contact 43 at terminal 44 and passes through sealing member 70 in bulkhead 12 and sealing member 71 in bulkhead 11 to the outside of the device. A further conductor 51 is connected to stationary contact 54 at terminal 52 and also passes through sealing means 70 in bulkhead 12 and sealing means 71 in bulkhead 11.

*Operation*

In explaining the operation of this embodiment of our invention, it may be helpful to consider the sequence of events taking place in what might be considered a normal execution of, for example, the demolition of a submarine utilizing a depth charge that might be dropped from an airplane or catapulted or dropped from a ship. Normally, a depth charge is detonated by a switching mechanism that is adapted to close a firing circuit when the depth charge reaches a predetermined depth in the fluid medium, in this case, water. The pressure at any given depth may be computed and the switch adjusted accordingly.

With the embodiment of our invention shown in the FIGURE suitably mounted in a depth charge, when the depth charge is introduced into a given area in the water, it will fall through the fluid medium or water, at some predetermined terminal velocity. As it falls through the medium with this substantially constant velocity, the pressure of the sea water being exerted on the interior of bellows 60 will increase at a given rate that is proportional to the velocity of the depth charge through the fluid medium. This increase in pressure will cause a displacement of the displaceable member 61 to the right. Initially, the displacement of displaceable member 61 will be transmitted through member 34 to the member 32 which member will then rotate about pin 33 and pin 31. This rotation will continue until the member 32 is stopped from such rotation by contact with the member 62 associated with the displaceable member 61. At this time, the stationary contact 54 and movable contact 55 have been separated thereby providing an open circuit between wires 51 and 50. Assuming that the depth charge continues to fall at a predetermined velocity, the motion of displaceable member 61 due to the expansion of the bellows 60 will be transmitted to the damping member 20 directly and the piston 22 of the damping member will also move toward the right side of the apparatus. It is noted that the poppet valve 23 may be opened by this motion to allow for relatively free and unimpeded motion of the displaceable member 61 in response to the increase in pressure on the inside of bellows 60. At some time during the travel of the displaceable member 61, the sliding contact 41 carried on member 34 will slide from the insulated member 42 to the conductive member 43 to allow completion of an electrical circuit between conductors 50 and 51 when the movable contact and stationary contact 54 are again engaged. When the displaceable member 61 reaches the limit of its travel, that is determined by the abutment of boss member 72 on displaceable member 61 with the bulkhead 14, the tension spring 57 will cause a counter clockwise rotation of member 32 about pin 33 to further drive the piston 22 and damping member 20 until the movable contact 55 on member 32 is stopped by stationary contact 54 on member 34. It may be noted that the spring constants of the spring 63 and the bellows 60 may be varied so as to allow predetermination of the depth at which the boss member 72 abuts on bulkhead 14. The closing of contact 55 with contact 54 completes an electrical circuit between conductors 50 and 51 that may be traced from terminal 44, connected to conductor 50, through stationary contact 43, movable sliding contact 41, bracket 40, member 34, pin 33, member 32, movable contact 55, stationary contact 54, and terminal 52 connected to conductor 51. The closure of the contacts 55 and 54 would then serve to activate the detonation circuit for the depth charge.

It has been observed that on some occasions the depth charge, due to unknown irregularities in the bottom of the sea, comes to rest on the bottom at a depth less than that which it is intended to be detonated. Should this occur, a pressure responsive device for activating the firing circuit will not be operative to cause detonation of the depth charge. In our novel invention, it will be noted that at any time, should the movement of displaceable member 61 cease, due to the depth charge coming to rest before a predetermined depth is reached, the action of the tension spring 57 as described above, will serve to close the contacts 54 and 55 to activate the detonating circuit. A certain amount of desirable time delay in the action of tension spring 57 in closing contacts 54 and 55 is inherent in the use of the damping member 20. It has been observed that this time delay is desirable since, through unknown causes, the rate of change of pressure due to the change of velocity of the depth charge falling through a fluid medium may fall below the predetermined minimum value for short periods of time during the mission of the depth charge. These transient periods should not cause detonation of the device and therefore the time delay is desirable to prevent abortion of the mission.

It will be noted that the stationary contacts associated with the sliding contact 41 comprise an insulated portion 42 and a conductive portion 43. It is necessary through this expedient or others to provide a delayed activation of the arming circuit. This is provided by the non-conductive member 42 that serves to prevent completion of the circuit between conductors 50 and 51 until the sliding contact 41 has been displaced a predetermined amount due to the increase of pressure on the inside of bellows 60 that causes the movement of displaceable member 61.

The explanation of operation as noted above is intended to be illustrative only, as other uses and applications of the principles of our invention may occur to those skilled in the art. Further, other means for accomplishing the ends of our invention may also be used and it is our intention to be limited solely by the scope of the appended claims.

We claim:

1. In apparatus of the class described; means displaceable in response to a change in a condition; damping means; lost motion linkage means connecting said displaceable means to said damping means, said linkage means normally biased to a first position and operable to transmit motion between said displaceable means and said damping means upon displacement to another position; and means connected to said lost motion linkage means for indicating the position of said linkage means.

2. In apparatus of the class described; means displaceable in response to a change in a condition; damping means; strain release means connecting said displaceable means to said damping means, said release means normally biased to a first position and operable to transmit motion between said displaceable means and said damping means upon displacement to another position; and switching means connected to said strain release means and operable in response to the position of said strain release means.

3. Apparatus responsive to a rate of change of pressure comprising: means responsive to change of pressure to provide a displacement of a first member, a second member operatively connected to said first member and effective in a first position relative to said first member to produce one controlling effect and in a second relative position to produce a second controlling effect, resilient means tending to maintain said first and second members in said first relative position, and damping means connected to said second member to limit the speed at which said second member may be moved by said first member without relative movement of said first and second members whereby when said change of pressure exceeds a predetermined rate, relative movement of said second member occurs to produce said controlling effect.

4. Apparatus responsive to a rate of change of pressure comprising: means responsive to change of pressure to provide a displacement of a first member, a second member operatively connected to said first member and effective in a first position relative to said first member to produce one controlling effect and in a second relative position to produce a second controlling effect, resilient means tending to maintain said first and second members in said first relative position, and damping means connected to said second member to limit the speed at which said second member may be moved by said first member without relative movement of said first and second members whereby when said change of pressure exceeds a predetermined rate, relative movement of said second member occurs to produce said controlling effect; and switching means connected to said first and second members for actuation by said members in accordance with the relative position of said members.

5. In apparatus of the class described; displacement means responsive to changes in pressure; damping means; and strain release connection means responsive to the velocity of motion of said displacement means for resiliently connecting said displacement means to said damping means when said change of pressure is below a predetermined value and for directly connecting said displacement means to said damping means when said change of pressure exceeds a predetermined value, said strain release means also having condition responsive means connected thereto for providing an indication of the rate of change of pressure applied to said displacement means.

6. In apparatus of the class described; displacement means responsive to changes in pressure; damping means; strain release connection means responsive to the velocity of displacement of said displacement means for resiliently connecting said displacement means to said damping means when said change of pressure is below a predetermined value and for directly connecting said displacement means to said damping means when said change of pressure exceeds a predetermined value, said strain release means being normally biased to resiliently connect said displacement means to said damping means; and switching means connected to said release means and operative in response thereto in one position when a resilient connection exists and in another position when a direct connection exists.

7. Apparatus for providing a signal indicative of a reduction of rate of change of pressure of a fluid medium below that of a predetermined minimum comprising; means displaceable in response to rate of change of pressure; damping means; means, including strain release means, connecting said displaceable means to said damping means, said strain release means being operable normally in a first position so as to close a circuit when the rate of change of pressure is below a predetermined value and operable in a second position so as to open said circuit and drivingly connect said displaceable means to said damping means when the rate of change of pressure exceeds a predetermined value.

References Cited in the file of this patent

UNITED STATES PATENTS

| | | |
|---|---|---|
| 2,751,785 | Fowler et al. | June 26, 1956 |
| 2,827,850 | Muzzey | Mar. 25, 1958 |